Aug. 19, 1930.  T. H. RICHTER  1,773,120
BRAKE FOR VEHICLES
Filed Sept. 17, 1928  2 Sheets-Sheet 1

Inventor.
Thomas H. Richter.
by
Lockwood & Lockwood,
His Attorneys.

Aug. 19, 1930.    T. H. RICHTER    1,773,120
BRAKE FOR VEHICLES
Filed Sept. 17, 1928    2 Sheets-Sheet 2
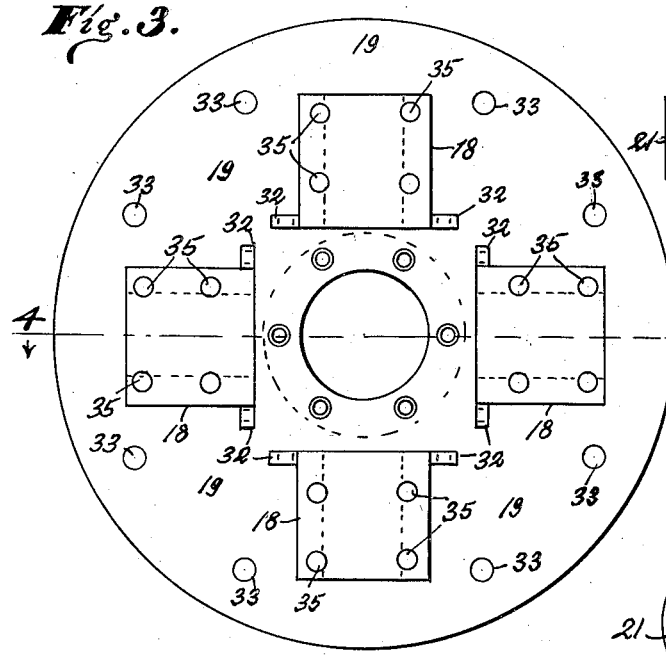
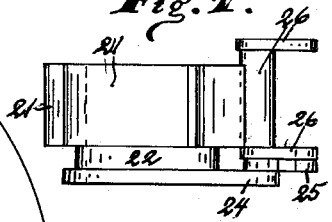
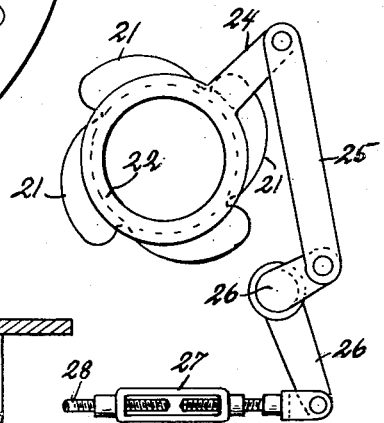
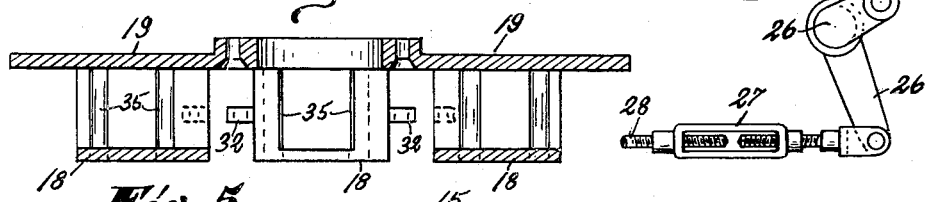
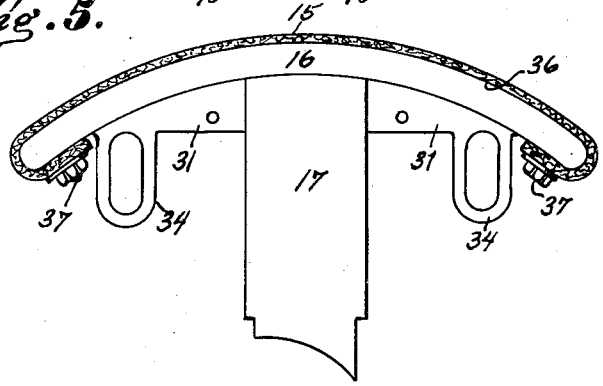
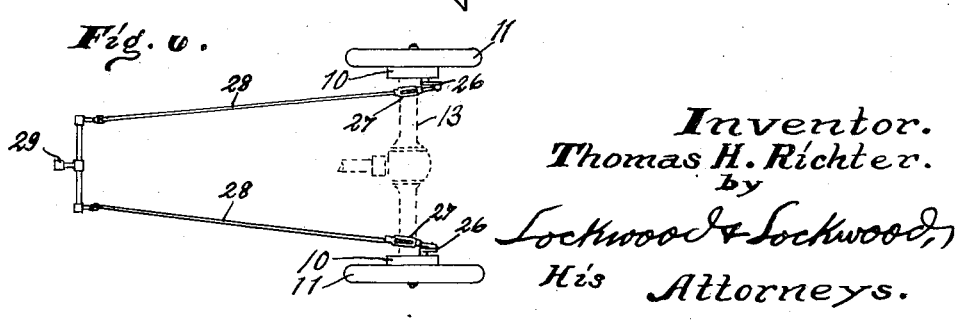
Inventor.
Thomas H. Richter.
by
Lockwood & Lockwood,
His Attorneys.

Patented Aug. 19, 1930

1,773,120

UNITED STATES PATENT OFFICE

THOMAS H. RICHTER, OF LOS ANGELES, CALIFORNIA

BRAKE FOR VEHICLES

Application filed September 17, 1928. Serial No. 306,450.

This invention relates to an improvement in a vehicle brake, and the principal object thereof is to provide a brake that is equally effective in retarding the rotation of a vehicle wheel such as is necessary in ordinary travel, and also to instantly lock or release the wheel in emergencies.

To that end I provide brake shoes arranged to engage nearly the entire inner peripheral surface of the brake drums with means for instantly moving the shoes outwardly to engage the drum with a force suited to the occasion; also I provide pairs of strong springs for each shoe that are normally under tension which instantly act to release the shoes when the brake pedal is moved toward idle position.

Another object of the invention is to provide a vehicle brake that will not stick after it has been operated to retard or stop the wheel and the brake pedal is moved toward idle position to release the brake. To that end I provide steel guide rollers in the guides for the brake plungers that are sufficiently loose in their sockets to permit them to move slightly when the plungers are moved, thereby avoiding frictional contact of the plungers with the walls of the guides so that the plunger are not liable to stick in the guides when the brakes are applied. In other words the rollers prevent the rotary force of the brake drum on the shoes when engaged from thrusting the plungers sidewise into the walls of the guides so as to cause them to stick.

Features of invention are shown in the construction, combination and arrangement of parts whereby a vehicle brake is provided that is easy to construct, assemble and operate and which is effective and durable in use.

A feature of invention is shown in the novel construction and arrangement of the brake shoes and means for lining them, whereby the lining is held smooth and taut on the surface of the shoes.

Other objects, advantages and features of invention may appear from the accompanying drawings, the subjoined detailed description and the appended claims.

The accompanying drawings illustrate the invention.

Figure 1:
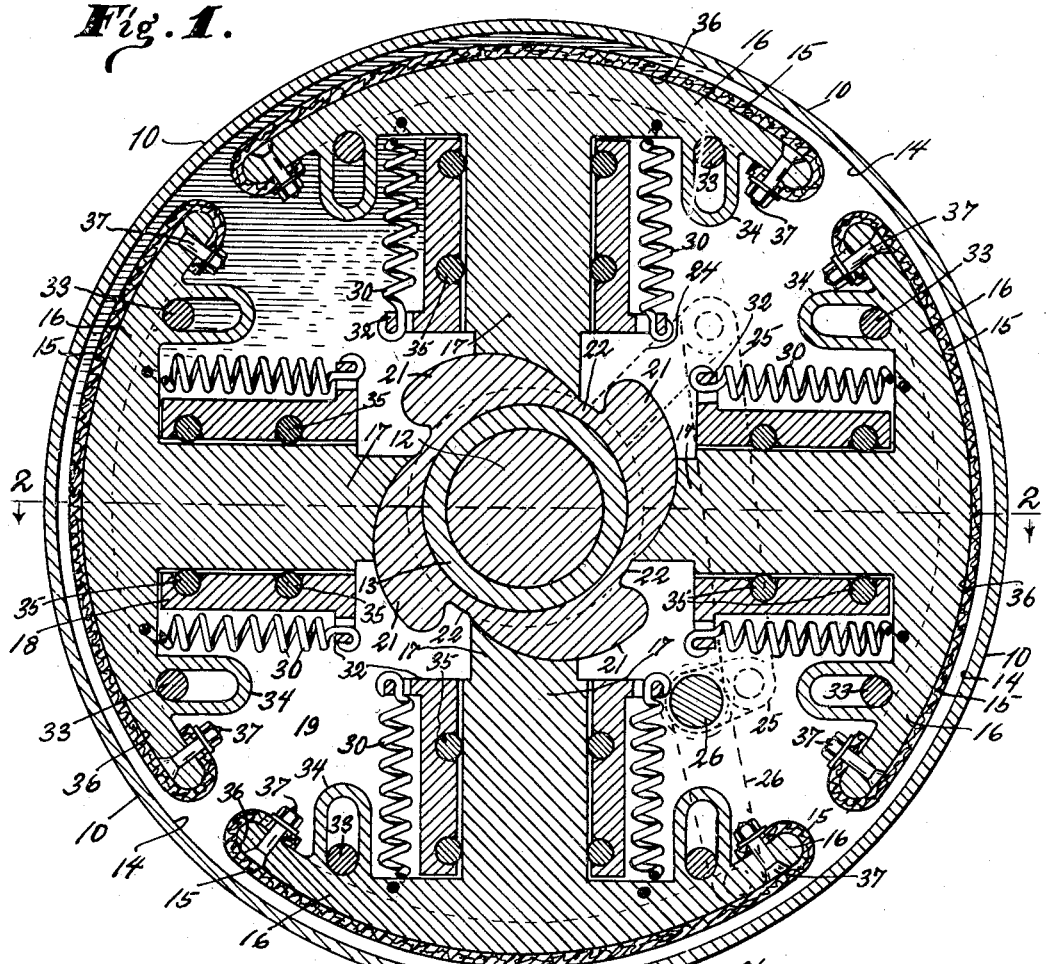
Figure 2:
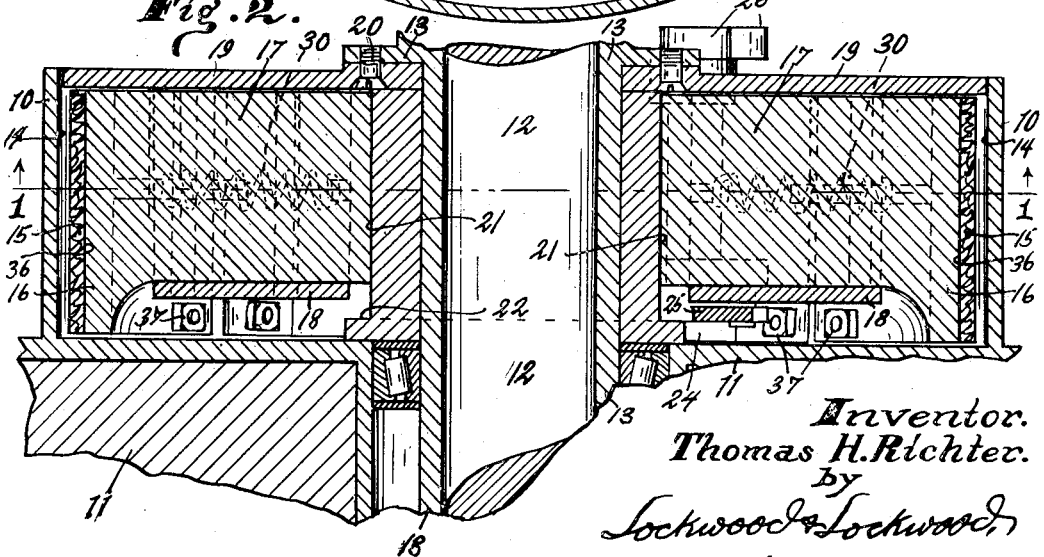

Fig. 1 is a central section through a brake drum constructed in accordance with this invention, showing the brake shoes out of engagement with the brake drum, and indicating by dotted lines the lever, link and bell crank for rotating the cam hub. The section is taken on the line 1—1 of Fig. 2. Fig. 2 is a fragmental section on line 2—2, Fig. 1, with the brake shoes in the same position as shown in Fig. 1. Fig. 3 is an end view of a non-rotary disk that carries the guides for the plungers and pins for guiding the ends of the brake shoes, showing the parts on a slightly reduced scale. Fig. 4 is a section on line 4—4, Fig. 3. Fig. 5 is a side view of one of the brake shoes detached from the brake. Fig. 6 is a diagrammatic plan view of the rear wheels of a vehicle with a pair of my improved brakes connected thereto, and showing turn-buckles in the connections between their crank arms and the foot brake pedal. Fig. 7 is a view of the cam and its operating means detached from the brake. Fig. 8 is an end view of the cam and operating means for adjusting one brake relative to another.

The vehicle brake includes a metal drum 10 that is secured to wheel 11, and an axle 12 in an axle housing 13 that can be constructed in the usual way or any desired manner.

The foregoing parts are old and well known in the art and for that reason are not shown or described in detail.

The drum 10 is provided with an internal peripheral braking surface 14 that is adapted to be engaged by the lining 15 on the brake shoes 16 to retard or stop the wheel.

The brake shoes 16 are integral with the outer ends of the plungers 17 that extend down through guides 18 that are integral with the disk 19 that is secured to the axle housing 13 in any well known way, as by brazing, or by screws 20, as indicated in Fig. 2. In other words, this disk is held stationary relative to the vehicle wheel.

The inner ends of the plungers 17 ride on the surfaces of the cams 21 that are integral with a hub 22 rotatably mounted on the axle housing 13 that extends inside the drum 10.

This hub 22 is provided with an arm 24 that is pivotally connected by a link 25 to a crank 26 that is extended through the disk 19 so that it can be connected by a turn-buckle 27 to the brake rod 28 and foot pedal 29 so that it can be adjusted relative to the other vehicle brake, as shown in Fig. 6.

The arm 24 and its connection to the brake pedal is such that when the pedal is moved in braking direction the cams 21 will force the brake shoes outwardly to engage their brake linings 15 with the drum, and when the arm 24 is moved in the reverse direction the springs 30 will disengage the brakes from the drum.

There is a pair of strong springs 30 for each brake shoe and they are arranged to disengage the brakes from the drum the instant the brake cams are reversely rotated. In other words these springs are always under tension and normally hold the inner ends of the plungers 17 engaged with the cams 21. The outer ends of the springs 30 are secured to the ribs 31 of the shoes and their inner ends are hooked over extensions 32 on the guides 18 and they coact with the guides in preventing the brakes from sticking or binding in braking position.

In addition to the guides 18 for the plungers 17 I also provide pins 33 for guiding the ends of the shoes. These pins extend through slotted extensions 34 that are integral with the shoes and arranged adjacent their ends. The pins 33 are secured to the disk 19 so they extend through the extensions 34 and coact with the guides 18 in guiding the brake shoes.

Also to insure free and easy movement of the brake shoes both toward and from the brake drum, I provide pairs of steel guide rollers 35 that are arranged to hold the plungers out of frictional contact with the walls of the guides and the rollers are sufficiently loose in their sockets to permit them to rotate slightly when the plungers are actuated.

Preferably there are four of the brake shoes, and each has a peripheral surface 36 over which the brake linings 15 are stretched and extended over and turned under the ends of the shoes and secured by bolts 37.

The bolts 37 are counter-sunk in the rims of the brake shoes and are secured to the turned under end portions of the brake linings so that only the linings engage the drum at any time.

The contour of the brake shoes is substantially the same curvature as the inside peripheral surface 14 of the brake drum, so that when the brakes are applied to retard or stop the wheel, the brake linings evenly engage the drum, or in other words the braking contact of the lining with the drum is substantially the same throughout.

In operation the arm 24 is moved by the brake pedal 29 to rotate the hub 22, and thereby move the cams 21 to drive the plungers outwardly to engage the brake linings with the drum to retard or stop the wheel; and the brakes are released by reversing the movement of the cams so that the springs 30 can act to release the brakes from the drum as described.

The brakes are constructed and arranged so that only a very slight pressure on the brake pedal is necessary to set the brakes sufficiently to retard the wheels and a slightly greater pressure on the pedal will stop rotation of the wheels until the brakes are released; and also the brakes are constructed of relatively heavy material so that they will not easily break in stopping the rotation of the wheels on relatively high speeds.

I claim as my invention:

1. A vehicle brake including a hollow brake drum secured to the wheel of a vehicle having an axle housing, a disk secured to the axle housing that is arranged to close one end of said drum, rectangular hollow guides integral with said disk, plungers extending through said guides, roller bearings interposed between said plungers and the walls of said guides, brake shoes on the outer ends of said plungers for engaging said drum, slotted extensions adjacent the ends of said shoes, pins in said disk arranged to extend through the slots of said extensions to guide the outer ends of said shoes, cams engaging the inner ends of said plungers for moving said shoes outwardly, and a pair of springs adjacent the ends of said shoes that are interposed between each shoe and its respective guide for the purpose specified.

2. A vehicle brake including a hollow drum secured to the wheel of a vehicle having an axle housing, a disk secured to the axle housing for closing one end of said drum, a plurality of brake shoes movable radially in said drum, brake linings on said shoes having end portions turned under the ends of said shoes, countersunk bolts in the ends of said shoes arranged to extend through the end portions of said linings so that only the faces of said linings engage said drums, and means for moving said shoes for the purpose specified.

3. A vehicle brake including a hollow drum secured to a vehicle wheel, a disk closing one end of said drum, guides integral with said disk, plungers slidably mounted in said guides, shoes integral with the outer ends of said plungers, cams for moving said plungers outwardly to engage said shoes with said drum, and steel guide rollers interposed between said plungers and the walls of said guides for the purpose specified.

In witness whereof, I have hereunto affixed my signature.

THOMAS H. RICHTER.